US011994281B2

(12) United States Patent
Rasmussen

(10) Patent No.: US 11,994,281 B2
(45) Date of Patent: May 28, 2024

(54) LIGHT FIXTURE

(71) Applicant: HARMAN PROFESSIONAL DENMARK APS, Aarhus N (DK)

(72) Inventor: Niels Joergen Rasmussen, Egaa (DK)

(73) Assignee: Harman Professional Denmark APS, Aarhus N (DK)

( * ) Notice: Subject to any disclaimer, the term of this patent is extended or adjusted under 35 U.S.C. 154(b) by 0 days.

(21) Appl. No.: 17/948,935

(22) Filed: Sep. 20, 2022

(65) Prior Publication Data

US 2024/0093863 A1 Mar. 21, 2024

(51) Int. Cl.
*F21V 31/00* (2006.01)
*F21V 5/04* (2006.01)

(52) U.S. Cl.
CPC .............. *F21V 31/005* (2013.01); *F21V 5/04* (2013.01)

(58) Field of Classification Search
CPC ................................ F21V 5/00; F21V 31/005
See application file for complete search history.

(56) References Cited

U.S. PATENT DOCUMENTS

| | | | | |
|---|---|---|---|---|
| 2,647,254 | A * | 7/1953 | Brunnhoelzl | F21L 4/00 362/186 |
| 3,787,675 | A * | 1/1974 | Rushing | F21L 4/00 362/205 |
| 5,642,931 | A * | 7/1997 | Gappelberg | F21L 2/00 362/186 |
| 7,261,438 | B2 * | 8/2007 | Alessio | F21V 14/06 362/268 |
| 9,605,813 | B2 * | 3/2017 | Collias | F21V 17/02 |
| 10,801,703 | B2 * | 10/2020 | Melzner | F21V 17/04 |
| 2002/0060911 | A1 * | 5/2002 | Brockmann | F21V 29/773 362/281 |

FOREIGN PATENT DOCUMENTS

EP 4053450 A1 7/2022

* cited by examiner

*Primary Examiner* — Arman B Fallahkhair
(74) *Attorney, Agent, or Firm* — Artegis Law Group, LLP

(57) ABSTRACT

The present disclosure provides a light fixture which comprises a compartment configured to house at least one light source and a lens movably arranged relative to the light source. The light fixture further comprises a deformable membrane having a tubular shape extending from a first end to a second end and forming an inner cavity. The first end of the membrane is attached to the lens. The second end of the membrane is attached to a sidewall of the compartment. The sidewall is extending circumferentially around the lens.

18 Claims, 6 Drawing Sheets

LIGHT FIXTURE

FIELD OF THE VARIOUS EMBODIMENTS

The various embodiments relate generally to light fixtures and more specifically to techniques for protecting light fixtures from moisture, particles, and/or contaminants.

BACKGROUND

Description of the Related Art

In many industrial lighting applications ingress protection is applied to improve robustness against water and particles, such as dust. Normally this causes increased costs and/or complexity, lower serviceability etc. When the protection is applied to joints between elements arranged for mutual movement, the solution often includes special sealings and hydrophobic grease where the drawback is higher friction and noise, and/or alternatively lower lighting quality.

In entertainment and architectural lighting, light fixtures, such as moving head light fixtures, are often used outdoor with the risk of rain showers and/or other sources of moisture. Therefore, the product should either be placed safely under a roof, or it should be ingress protected with IP class 44 or higher. An important section of a moving head light fixture is the movement of the lens relative to the light source(s) arranged in the head. Traditionally an extra window is arranged in front of the lens at a distance to allow movement of the lens relative to the light source(s) without collision with the window. The window can protect the lens and decrease the risk of moisture ingress into the head. However, the window may cause internal reflections, and fingerprints on the window may change the output light. The window itself may additionally decrease the output form the light source(s) and may add weight to the moving head light fixture.

SUMMARY

One embodiment sets forth a light fixture which comprises a compartment configured to house at least one light source and a lens movably arranged relative to the light source. The light source further comprises a deformable membrane having a tubular shape extending from a first end to a second end and forming an inner cavity. The first end of the membrane is attached to the lens. The second end of the membrane is attached to a sidewall of the compartment. The sidewall is extending circumferentially around the lens.

At least one technical advantage of the disclosed techniques relative to the prior art is that, with the disclosed techniques, a light fixture and/or a compartment within the light fixture are better protected from moisture, particles, and/or contaminants. Furthermore, the light fixture is lighter in weight and provides a higher quality of light than prior art approaches that use a protective window. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
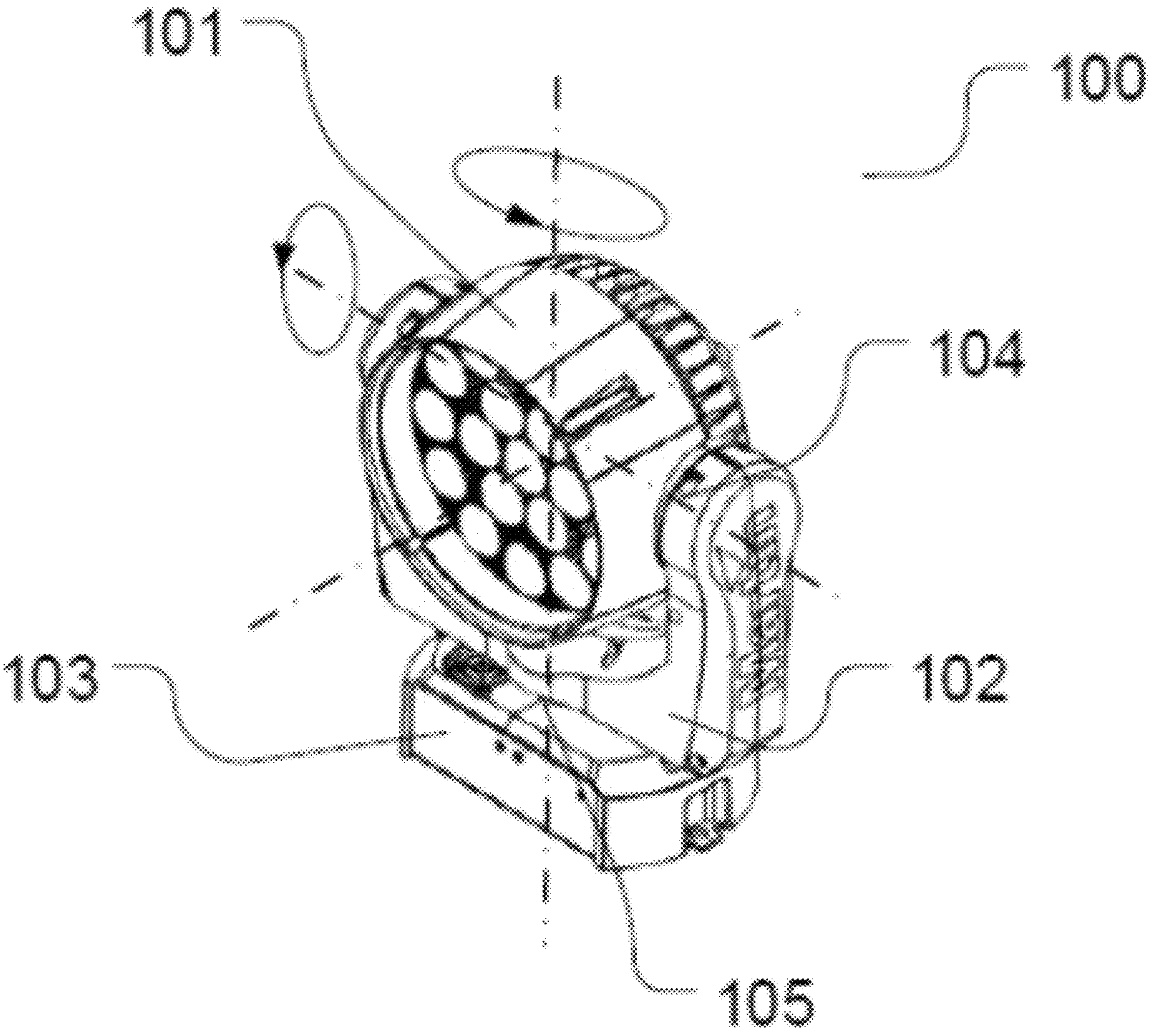
FIG. 1 illustrates a light fixture, according to various embodiments.
Figure 2:
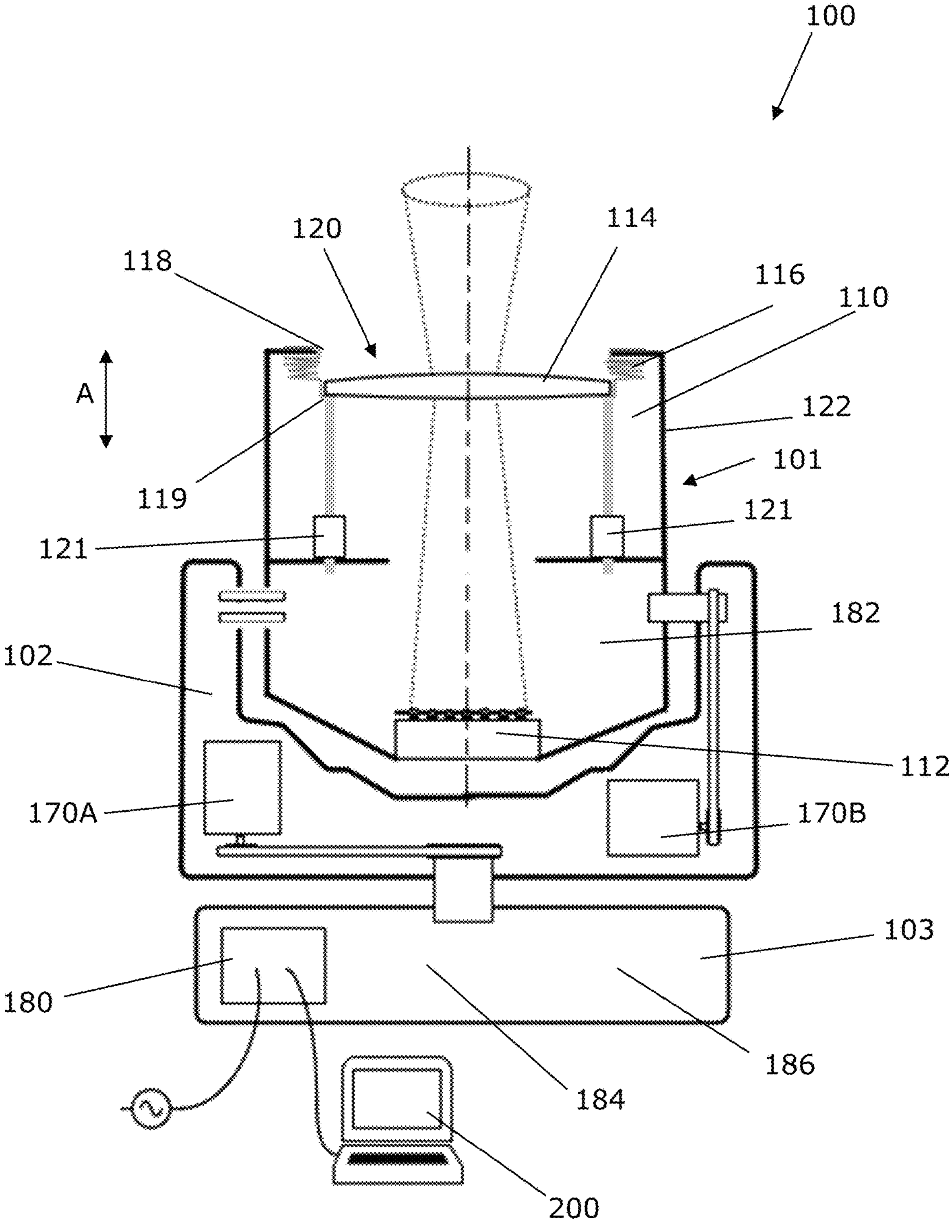
FIG. 2 illustrates a cross-section through the light fixture of FIG. 1 with a deformable membrane in a compressed configuration, according to various embodiments.
Figure 3:
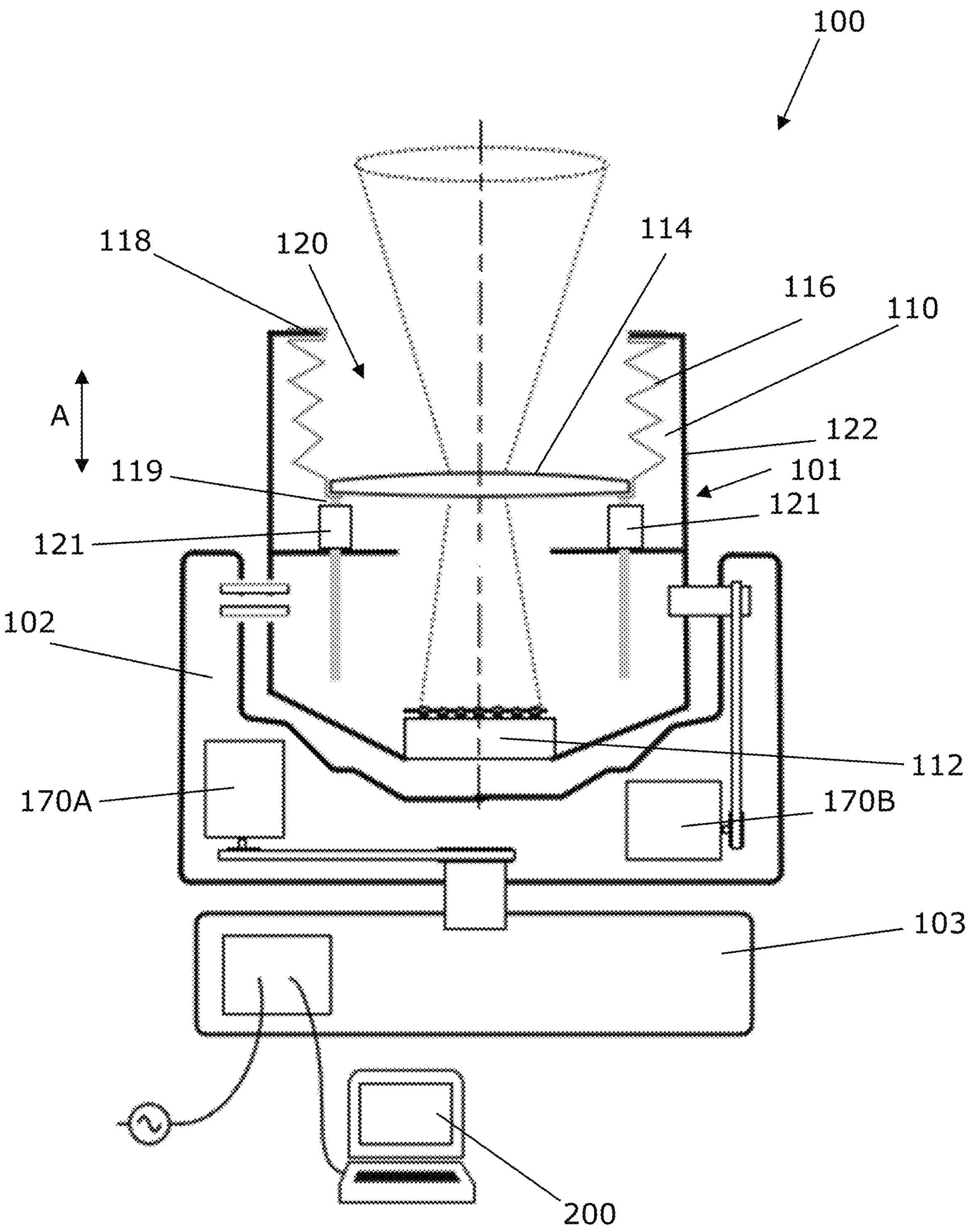
FIG. 3 illustrates a cross-section through the light fixture of FIG. 1 with a deformable membrane in an extended configuration, according to various embodiments.

FIGS. 1, 2, and 3 illustrate of a light fixture 100 in the form of a moving head light fixture, according to various embodiments. FIGS. 2 and 3 illustrate cross-sectional views. The light fixture 100 comprises, without limitation, a head 101, a yoke 102, and a base 103. Two first joints 104 are arranged between the head 101 and the yoke 102, and a second joint 105 is arranged between the between base 103 and the yoke 102 to provide a head 101 being rotatably connected to a yoke 102, and a yoke 102 being rotatably connected to a base 103. In some cases, the head 101 is alternatively referred to as a first element 101. Thus, FIG. 1 illustrates a light fixture 100 which comprises a first element 101 forming a first compartment 110. The first compartment 110 houses at least one light source 112 as shown in FIGS. 2 and 3.

FIGS. 2 and 3 illustrate cross-sectional views of the light fixture 100. A lens 114 is movably arranged relative to the light sources 112. The lens 114 is arranged substantially perpendicular to the at least one light source 112, and movement of the lens 114 relative to the light source 112 is a substantially linear movement in a direction away from at least one light source 112 or towards the at least one light source 112, as indicated by the arrow A. In some embodiments, the lens 114 is a lens group.

A deformable membrane 116 having a tubular shape extends from a first end 118 to a second end 119 and forms an inner cavity 120. The membrane 116 is at the first end 118 attached to the lens 114 and is at the second end 119 attached to a sidewall 122 of the first element 101. The sidewall 122 extends circumferentially around the lens 114, and the lens 114 moves relative to the sidewall 122. In FIG. 2 the deformable membrane 116 is in a compressed configuration, whereas in FIG. 3, the deformable membrane 116 is in an extended configuration.

Because the membrane 116 is attached to the lens 114 at the first end 118, the lens 114 closes the tube at the first end, while the tube formed by the membrane 116 is open at the second end 119 to allow unhindered passage for light beams from the at least one light source 112.

When moving the lens 114 relative to the at least one light source 112, the membrane 116 is compressed and expanded with the movement of the lens 114 because the membrane 116 at the first end 118 is attached to the lens 114 and the membrane 116 at the second end 119 is attached to a sidewall 122 of the first element 101. The lens 114 is moved back and forth in front of the light sources 112 by use of a plurality of motors 121, where only two motors 121 are visible. In the illustrated embodiments, the motors 121 are linear motors in the form of spindle motors. The two visible motors 121 are oppositely arranged relative to a center axis extending through the center of the light source to facilitate linear movement of the lens 114.

By attaching the membrane 116 to the lens 114 at the first end 118, and to the sidewall 122 of the first element 101 at the second end, it is possible to seal an opening (not shown) along on outer periphery of the lens 114 to thereby avoid the ingress of dust, particles, moisture, and/or contaminants into the first compartment 110 along this periphery. It is consequently possible to avoid the use of an extra sealing window, which, in conventional light fixtures is typically arranged in front of the lens 114 at a distance thereto, such as close to the free end of the sidewall 122.

Two motors 170A, 170B are arranged for movement of the first element/head 101. The motor 170A rotates the head 101, and the motor 170B tilts the head 101.

An external computer 200 is in communication with a controller 180 integrated in the base 103. The controller 180 is arranged to control movement of the lens 114, to control the at least one light source 112, to control movement the head 101, to control movement of the second element/the yoke 102, and/or the like. Additionally, a driver board 182 is arranged in the head 101 for control of the head 101 and the at least one light source 112. The driver board 182 is in communication with the controller 180.

In the illustrated embodiments, the base 103 further comprises a user input element 184. In some embodiments, the user input element 184 comprises one or more buttons, one or more touch pads, a keyboard, and/or the like. Additionally, the base 103 comprises a display 186 enabling a user to interact with the user input element 184.

Figure 4A:
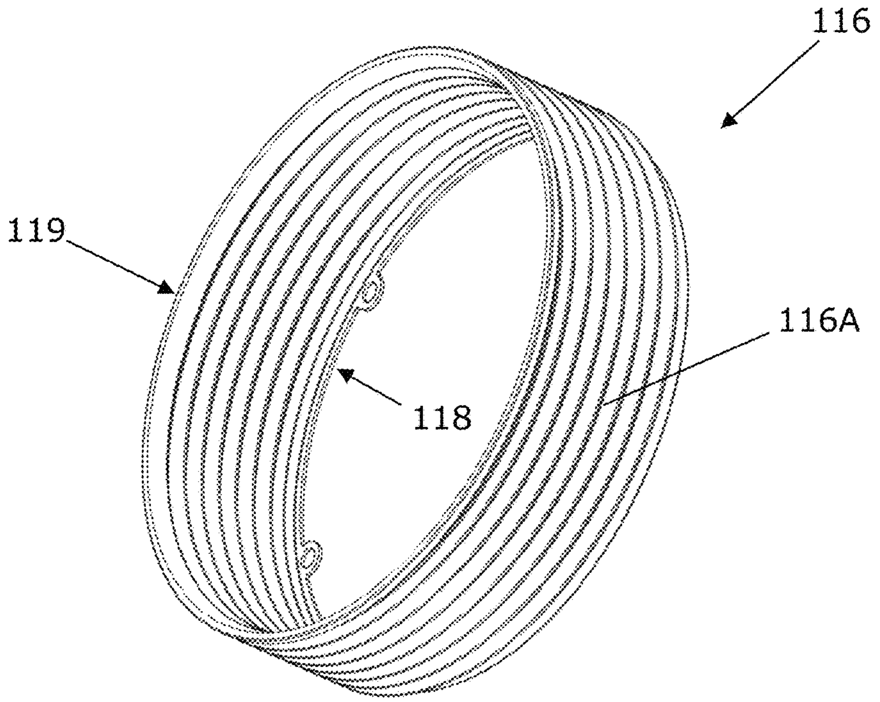
FIGS. 4A and 4B illustrate a deformable membrane in an extended and a compressed configuration, according to various embodiments.
Figure 4B:
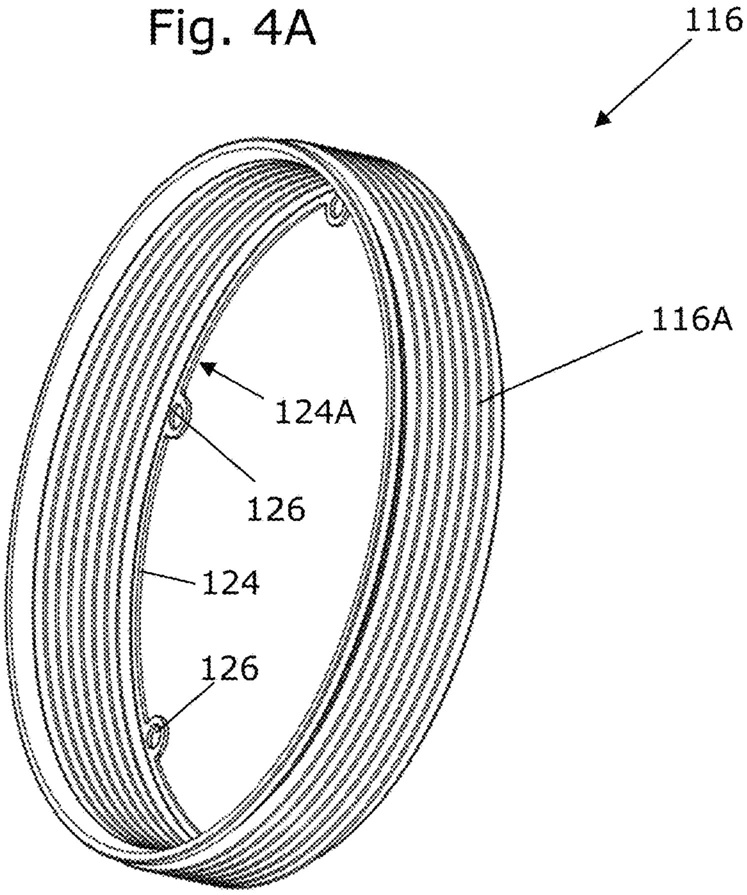
Figure 5A:
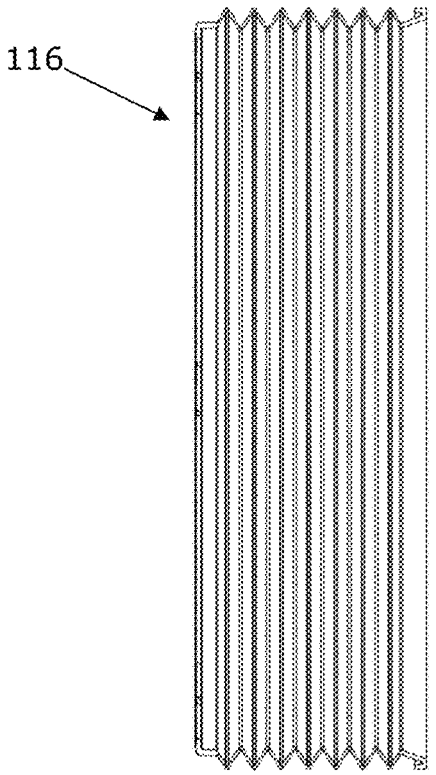
FIGS. 5A and 5B illustrate a sideview of the deformable membrane FIGS. 4A and 4B in an extended and a compressed configuration, according to various embodiments.
Figure 5B:
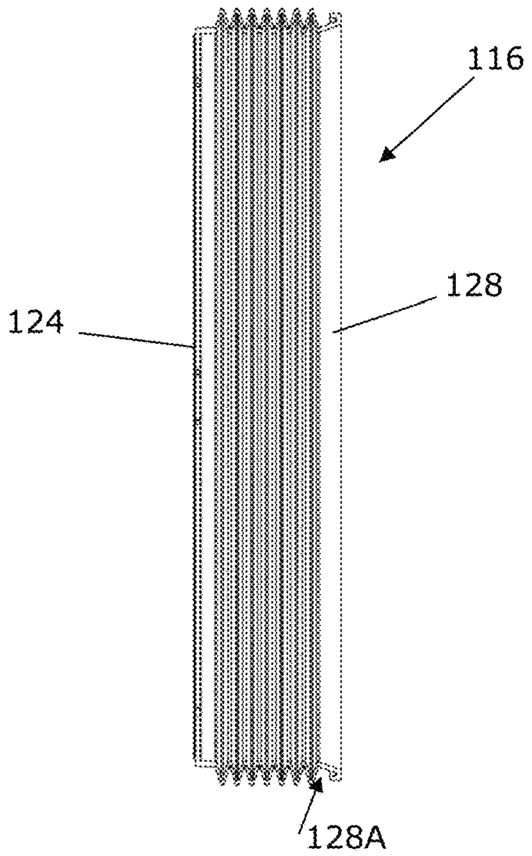
Figure 6:
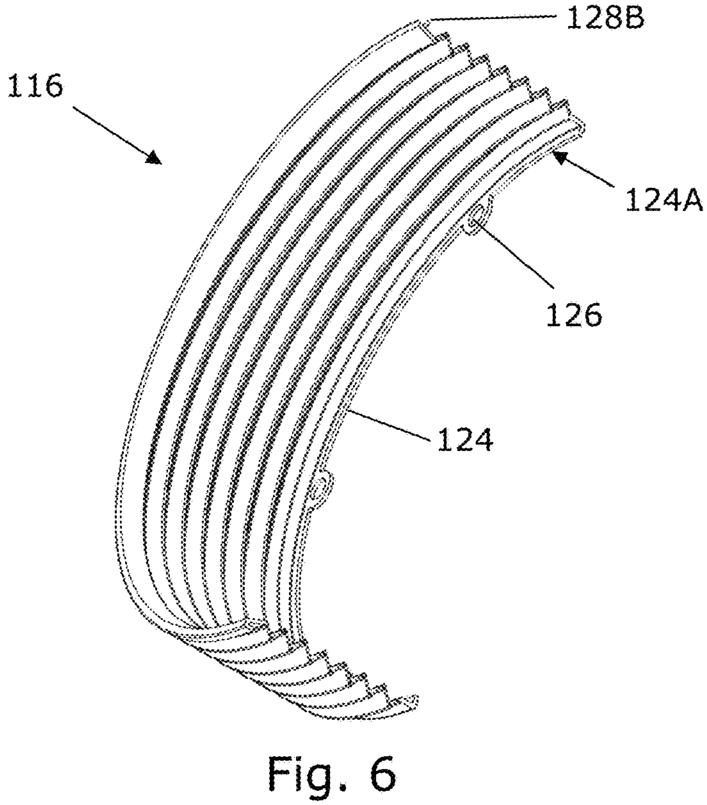
FIG. 6 illustrates a cross-sectional view of the deformable membrane of FIGS. 4A and 4B, according to various embodiments.

FIGS. 4A and 4B illustrate a deformable membrane 116 in an extended (FIG. 4A) and a compressed configuration (FIG. 4B), according to various embodiments. FIGS. 5A and 5B illustrate a sideview of the deformable membrane in an extended (FIG. 5A) and a compressed configuration (FIG. 5B), according to various embodiments. FIG. 6 illustrates a cross-sectional view of the deformable membrane 116, according to various embodiments.

As shown in FIGS. 4A-6, the membrane 116 comprises a bellows 116A having a pleated expansible part allowing movement of the lens 114 relative to the at least one light source 112, while the bellows 116A is extended and compressed with the movement of the lens 114.

To facilitate attachment of the membrane 116 to the lens 114, the membrane 116 at the first end 118 comprises an edge portion 124 extending toward the inner cavity 120. The edge portion 124 terminates in a first free end 124A. The lens 114 is attached to the membrane 116 along the edge portion 124. A plurality of apertures 126 are formed in the edge portion for attachment of the lens 114 to the membrane 116.

To facilitate attachment of the second end 119 to the sidewall 122, the membrane 116 at the second end 119 comprises an outwardly projecting wall portion 128 forming a collar 128A circumferentially around the membrane 116. The projecting wall portion 128 extends outwardly from the tubular shape and terminates in a second free edge 128B outside the cavity. As shown, the outwardly projecting wall portion 128 is formed integrally with the membrane 116.

Figure 7:
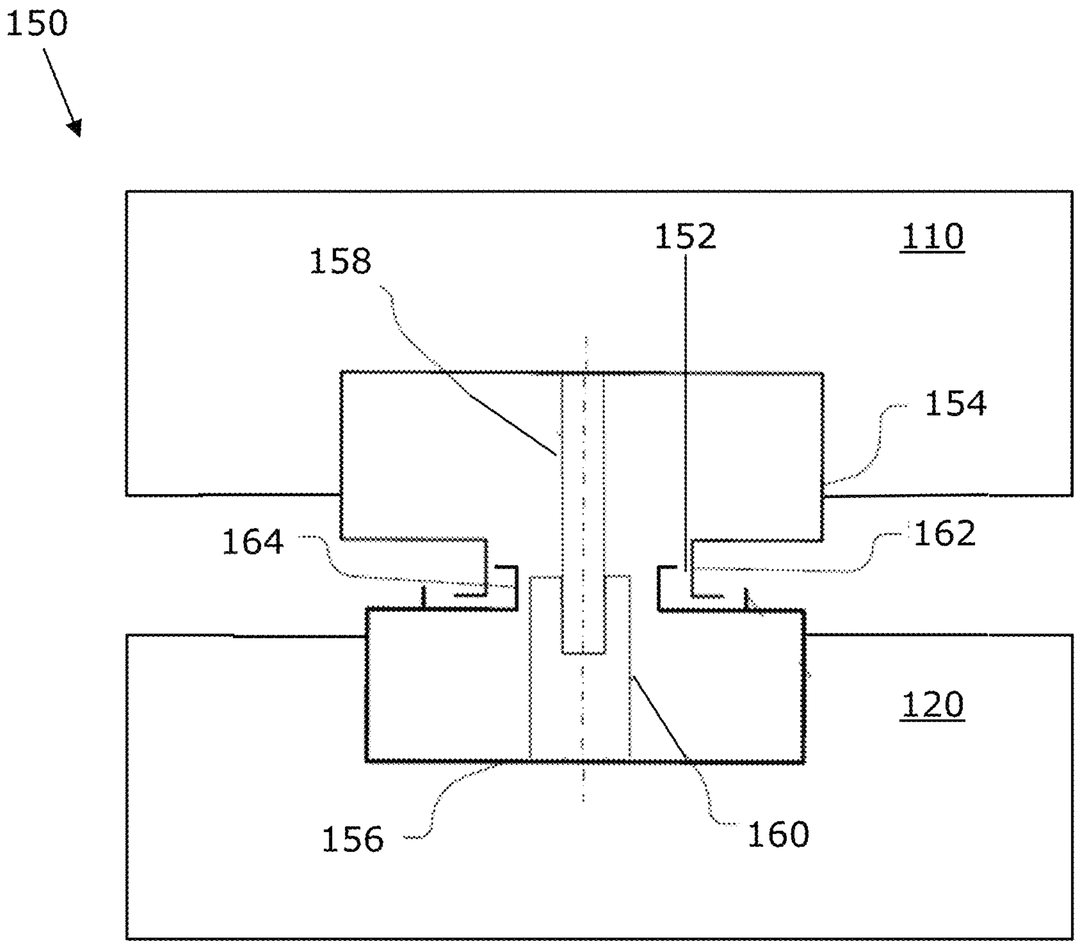
FIG. 7 illustrates a protected joint, according to various embodiments.

FIG. 7 illustrates a protected joint 150, according to various embodiments. The projected joint 150 forms an opening 152 which in cooperation with movement of the lens 114 ensures pressure equalization within the light fixture 100.

Movement of the lens 114 creates a negative or a positive pressure in the first compartment 110, when moving the lens 114 back and forth relative to the at least one light source 112. To avoid such negative and positive pressure inside the first compartment 110, an opening 152 is arranged between the first compartment 110 and the surroundings.

In some embodiments, the opening 152 is located in a joint 150 between a first element (e.g., the head 101) and the second element (e.g., the yoke 102) when the light fixture is a moving head light fixture. Alternatively, or additionally, the opening is located in a joint between the second element (e.g., the yoke 102) and a third element (e.g., the base 103). In some embodiments, the light fixture 100 comprises a plurality of openings.

In some embodiments, the opening 152 is arranged in a rotational joint 150 between, for example, the first element 101 and the second element 102. The joint 150 comprises first and second joint elements 154, 156 which comprise cooperating first and second attachment structures 158, 160. The first and second attachments structures 158, 160 engage each other to form the rotational joint 150. The first joint element 154 comprises an outwardly projecting wall portion forming a first collar 162 circumferentially around a first opening 152 in the first joint element 154. The first collar 162 is substantially U-shaped.

In some embodiments, the second joint element 156 comprises a groove 164 configured to receive the first collar 162. The groove 164 extends circumferentially around a center axis of the second attachment structure 160. Alternatively, the second groove is omitted in other embodiments.

Embodiments disclosed herein include a light fixture. The light fixture includes a deformable membrane that protects the light fixture and/or one or more compartments within the light fixture from potentially damaging moisture, particles, and/or contaminants. In various embodiments, the deformable membrane is located between a lens of the light fixture and a sidewall of a housing for the light fixture where a light source is located.

In some embodiments, the light fixture is a moving head light fixture, which typically comprises a head including a plurality of light sources arranged for creating a light beam and a plurality of light effect elements with which various light effects can be generated. In some examples, the head is rotatably connected to a yoke and the yoke is rotatably connected to a base. In some examples, the moving head light fixture allows an angular position of the yoke relative to the base between 0 and 540°, meaning that the yoke can be rotated up to 1½ revolutions relative to the base. In some examples, the head is movable relative to the yoke in a pitch angle ranging from 0 to 270°. In some embodiments, the range of pitch angle depends on a type of the light fixture and can be larger or smaller than the range of 0 to 270°. In some embodiments, in which the light fixture is a moving head light fixture, the first element is a head movably attached to a yoke. It should, however, be understood that that in other embodiments, the light fixture is alternatively another type of light fixture comprising at least one light source.

In some embodiments, the light fixture includes a first element that forms a first compartment which houses at least one light source. In some embodiments, the first element further comprises one or more of a framing system for shaping the light beam(s), a motor, and/or a fan for cooling the first compartment.

The lens is movably arranged relative to the light source. In some embodiments, the lens is a zoom lens, which is arranged to change a divergence of a light beam and/or a width of the light beam. In some embodiments, the lens includes a lens group including a plurality of lenses. As an example, the lens group can comprise one lens for each light source, whereby movement of each lens is relative to a respective light source.

In some embodiments, the lens and/or the lens group is arranged substantially perpendicular to the at least on light source, and the movement relative to the light source is substantially linear movement in a direction away from at least one light source and/or towards the at least one light source. In some embodiments, the lens is part of a lens module. In some embodiments, additional secondary light sources are attached to the lens module to provide further possibilities for different illumination patterns.

The light fixture comprises a deformable membrane having a tubular shape extending from a first end to a second end and forming an inner cavity, where the membrane at the first end is attached to the lens, and at the second end is attached to a sidewall of the first element, the sidewall extending circumferentially around the lens. In some embodiments, when the membrane is attached to the lens at the first end, the lens closes the tube at the first end, while the tube formed by the membrane is open at the second end.

In some embodiments, when moving the lens relative to the at least one light source (e.g., back and forth in front of the at least one light source in a movement direction away from the at least one light source or towards the at least one light source) the membrane is compressed and expanded because the membrane at the first end is attached to the lens, and at the second end is attached to the sidewall of the first element.

By attaching the membrane to the lens at the first end, and to the sidewall of the first element at the second end, the membrane seals an opening along on outer periphery of the lens to thereby avoid the ingress of dust, particles, moisture, and/or contaminants into the first compartment along this periphery. In some embodiments, use of the membrane makes it possible to omit the extra sealing window typically arranged in front of the lens at a distance thereto.

In some embodiments, the membrane extends along at least a part of an inner surface of the sidewall, where the overlapping area of the membrane and the sidewall depends on the position of the lens. In some embodiments, the overlapping area between the sidewall is arranged circumferentially around the lens, and the overlap of the membrane with the sidewall varies with the position of the lens. For example, when the lens is positioned in an innermost position (e.g., a position close to the at least one light source) the membrane fully overlaps the sidewall. In another example, when the lens is positioned at an outer position (e.g., an outermost position relative to the at least one light source) the overlapping area between the sidewall and the membrane is a minimum overlap. In some embodiments, the overlap is in the range of 50-150 mm.

The membrane has a length corresponding to a distance between the first end and the second end, where the length varies with movement of the lens. Thus, the length of the membrane is longest, when the lens is at the innermost position, where the membrane is fully extended, whereas the length is shortest, when the lens is at the outermost position, where the membrane is fully compressed. In some embodiments, the length of the membrane varies up to 300 mm, such as up to 200 mm, such as 150 mm, such as up to 120 mm, such as up to 100 mm, such as up to 80 mm, such as up to 60 mm with movement of the lens. In some embodiments, the variation depends on the size of the light fixture and/or the lens.

In some embodiments, the membrane comprises a bellows. The bellows includes a pleated expansible part allowing movement of the lens relative to the at least one light source, while the bellows and/or the pleated expandable part is extended and compressed with the movement of the lens. In some embodiments, the bellows is made of a flexible material. As an alternative to a bellows, the membrane is made of a flexible material, such as an elastic material being stretchable to allow the membrane to be extended and contracted when moving the lens relative to the at least one light source.

In some embodiments, the bellows is made from polytetrafluoroethylene (PTFE or Teflon), polyoxymethylene (POM), or aluminum. In some embodiments, the material is cut by a lathe process to form the bellows.

In some embodiments, a diameter of the tubular shaped membrane is in the range of 100-500 mm, such as in the range of 150-300 mm. In some embodiments, the size of the diameter depends on the size of the light fixture and/or the size of the lens.

In some embodiments, a material thickness of the membrane is in the range of 0.5-3.0 mm, such as in the range of 0.7-2.5 mm, such as in the range of 1.0-2.0 mm. In some embodiments, the membrane is made of rubber, such as ethylene propylene diene monomer (EPDM), or an elastomer, such as silicone. In should be understood, that other elastic materials can be used in alternative embodiments. In some embodiments, the membrane is made of PTFE, POM, or aluminum.

In some embodiments, to facilitate attachment of the membrane to the lens, the membrane at the first end comprises an edge portion extending toward the inner cavity and the edge portion terminates in a first free end. The lens is attached to the membrane along the edge portion. In some embodiments, the edge portion is attached to a lower surface of the lens. As the edge portion extends towards the inner cavity, the edge portion additionally seals the joint between the membrane and the lens.

In some embodiments, a plurality of apertures is formed in the edge portion for attachment of the lens. For example, a screw can be inserted through an aperture for cooperation with a corresponding opening in a lower surface of the lens. In such embodiments, the opening comprises an inner thread for engagement with the screw. Alternatively or additionally, the membrane is adhesively attached to the lens. It should be understood that any other technically feasible way of attachment are also possible.

In some embodiments, to facilitate attachment of the second end to the sidewall, the membrane at the second end comprises an outwardly projecting wall portion forming a collar circumferentially around the membrane. The outwardly projecting wall portion extends outwardly from the tubular shape and terminates in a second free edge outside the cavity. In some embodiments, the outwardly projecting wall portion is formed integrally with membrane. Alternatively, the outwardly projecting wall portion is formed as a separate element, which is subsequently attached to the second end of the membrane.

In some embodiment, the collar is substantially U-shaped (e.g., formed by two substantially parallel legs joined by an intermediate section forming the bottom part of the U-shape. It should be understood, that both a U-shaped collar, a V-shaped collar, and/or a L-shaped collar can be formed by the outwardly projecting wall portion. In some embodiments, the outwardly projecting wall portion forming the collar is created by folding the second end outwardly and downwardly along the outer surface of the membrane.

In some embodiments, to attach the second end of the membrane to the sidewall, an end portion of the sidewall is arranged in the collar. In some embodiments, the second end is additionally adhesively and/or otherwise attached to the sidewall.

In some embodiments, because the lens is movably arranged relative to the at least one light source, the deformable membrane at the first end is attached to the lens, and the deformable membrane at the second end is attached to a sidewall of the first element, movement of the lens back and forth relative to the at least one light source creates a negative or a positive pressure in the first compartment. In some embodiments, to avoid such negative or positive pressure inside the first compartment, an opening is arranged between the compartment and the surroundings. Dependent on the size of the lens and the membrane, movement of the lens relative to the at least on light source can result in an air exchange between the first compartment and the surroundings. In some examples, the air exchange includes up to 1.4 liters of air, when moving the lens from the outermost position to the innermost position.

In some embodiments, the light fixture further comprises at least one motor, such as two, three, or four or more motors configured to move the lens. The at least one motor is controlled by input from a computer. In some embodiments, the light fixture comprises two motors, such as linear motors in the form of spindle motors. The two motors are oppositely arranged relative to a center axis extending through the center of the at least one light source to facilitate linear movement of the lens.

In some embodiments, because the at least one light source can generate a substantial amount of heat, the computer is additionally configured to control movement of the lens in order to ventilate the light fixture if a predetermined temperature is exceeded. As described above, because movement of the lens relative to the at least one light source can result in an air exchange between the first compartment and the surroundings, when moving the lens from the outermost position to the innermost position, by increasing the movement frequency of the lens results in ventilation of the first compartment to address overheating when the predetermined temperature is exceeded.

In some embodiments, to avoid overheating, a temperature sensor is arranged in the first compartment. The temperature sensor is configured to transmit a temperature signal to the computer which in response to the received temperature signal increases the movement frequency of the lens. Furthermore, the computer can be configured to decrease the movement frequency in response to a temperature signal below a predetermined shut off temperature.

In some embodiments, the light fixture further comprises a second element attached to the first element. For example, when the light fixture is a moving head light fixture, the second element is a yoke. In some embodiments, an opening is arranged in a joint between the first and second elements. The opening allows ventilation of and/or pressure equalization in the first compartment and/or in a second compartment formed in the second element. In some embodiments, the opening is arranged in a rotational joint between the first and second elements, where the first and second elements comprise cooperating first and second attachment structures.

In some embodiments, to avoid or at least considerably reduce the risk of the ingress of dust, particles, moisture, and/or contaminants via the opening arranged in the joint, the first attachment structure is located in the first compartment and extends in a first direction towards the second element, where the second attachment structure forms part of the second element. In some embodiments, the first element comprises an outwardly projecting wall portion forming a first collar circumferentially around a first opening in the first element. In some embodiments, the second element comprises a groove configured to receive the first collar, where the groove extends circumferentially around a center axis of the second attachment structure.

When rain and/or other moisture falls onto the light fixture, droplets may stick to an outer surface to the first and/or second element due to surface adhesion forces in the water, and the droplets may the follow the outer surface of the first and/or second element. By providing a collar circumferentially around the first opening, the droplets are guided away from the first opening and even ramped off to allow drainage of water away from the opening substantially independent of the orientation of the joint.

In some embodiments, the second element comprises a groove configured to receive the first collar, where the groove extends circumferentially around a center axis of the second attachment structure. The groove forms an opening configured to receive the first collar. Arranging the first collar in the groove, provides additional protection of the first opening and thereby the joint, as the groove provides additional guidance for the droplets away from the first opening. In some embodiments, a first collar around the first opening is sufficient for protecting the joint.

In sum, a light fixture includes a deformable membrane or bellows that protects the light fixture and/or one or more compartments within the light fixture from potentially damaging moisture, particles, and/or contaminants. The deformable membrane is located between a lens of a light fixture and a sidewall of a housing for the light fixture where a light source is located and provides a seal between the lens and an interior of the light fixture.

At least one technical advantage of the disclosed techniques relative to the prior art is that, with the disclosed techniques, a light fixture and/or a compartment within the light fixture are better protected from moisture, particles, and/or contaminants. Furthermore, the light fixture is lighter in weight and provides a higher quality of light than prior art approaches that use a protective window. These technical advantages represent one or more technological improvements over prior art approaches.

1. According to some embodiments, a light fixture comprises a compartment configured to house at least one light source, a lens movably arranged relative to the light source, and a deformable membrane having a tubular shape extending from a first end to a second end and forming an inner cavity. The first end of the membrane is attached to the lens, the second end of the membrane is attached to a sidewall of the compartment, and the sidewall is extending circumferentially around the lens.

2. The light fixture according to clause 1, wherein the lens is arranged substantially perpendicular to the at least one light source, and wherein movement of the lens relative to the at least one light source is a substantially linear movement in a direction away from the at least one light source or towards the at least one light source.

3. The light fixture according to clause 1 or clause 2, wherein the sidewall extends in the direction away from the at least one light source or towards the at least one light source.

4. The light fixture according to any of clauses 1-3, wherein a length of the membrane extends from the first end to the second end, and wherein the length varies with movement of the lens.

5. The light fixture according to any of clauses 1-4, wherein the length varies up to 300 mm with the movement of the lens.

6. The light fixture according to any of clauses 1-5, wherein the membrane comprises a bellows.

7. The light fixture according to any of clauses 1-6, wherein a diameter of the membrane is between 100 mm and 500 mm.

8. The light fixture according to any of clauses 1-7, wherein a material thickness of the membrane is between 0.5 and 3.0 mm.

9. The light fixture according to any of clauses 1-8, wherein the membrane is made from a material selected from a group consisting of rubber, ethylene propylene diene monomer (EPDM), an elastomer, silicone, polytetrafluoroethylene (PTFE), polyoxymethylene (POM), and aluminum.

10. The light fixture according to clause 1, wherein the membrane at the first end comprises an edge portion extending toward the inner cavity and terminating in a free end, and wherein the lens is attached to the membrane along the edge portion.

11. The light fixture according to any of clauses 1-10, wherein a plurality of apertures is formed in the edge portion for attachment of the lens.

12. The light fixture according to any of clauses 1-11, wherein the membrane at the second end comprises an outwardly projecting wall portion forming a collar circumferentially around the membrane, the projecting wall portion extending outwardly from the tubular shape and terminating in a free edge outside the inner cavity.

13. The light fixture according to any of clauses 1-12, wherein an end portion of the sidewall is arranged in the collar to attach the second end to the sidewall.

14. The light fixture according to any of clauses 1-13, wherein secondary light sources are attached to the lens.

15. The light fixture according to any of clauses 1-14, further comprising at least one motor configured to move the lens, the at least one motor being controlled by input from a computer.

16. The light fixture according to any of clauses 1-15, wherein the computer controls movement of the lens in order to ventilate the light fixture when a predetermined temperature is exceeded.

17. The light fixture according to any of clauses 1-16, further comprising a second compartment, wherein an opening is arranged in a joint between the compartment and the second compartment to allow at least one of ventilation of or pressure equalization in at least one of the first compartment or the second compartment.

18. The light fixture according to any of clauses 1-17, wherein the opening is arranged in a rotational joint between the first compartment and the second compartment, the rotational joint comprising cooperating first and second attachment structures.

Although the present disclosure has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While the preceding is directed to embodiments of the present disclosure, other and further embodiments of the disclosure may be devised without departing from the basic scope thereof, and the scope thereof is determined by the claims that follow.

What is claimed is:

1. A light fixture comprising: a first compartment comprising a sidewall extending circumferentially around a lens, wherein the first compartment is configured to house at least one light source emitting light towards an input side of the lens, wherein the lens is movably arranged relative to the at least one light source; and a deformable membrane having a tubular shape extending from a first end to a second end and forming an inner cavity; wherein the first end of the deformable membrane is attached to the lens, wherein the second end of the deformable membrane is attached to the sidewall of the first compartment on an output side of the lens, and wherein the inner cavity formed by the deformable membrane is closed by the lens at the first end and is open at the second end.

2. The light fixture according to claim 1, wherein the lens is arranged substantially perpendicular to the at least one light source, and wherein movement of the lens relative to the at least one light source is a substantially linear movement in a direction away from the at least one light source or towards the at least one light source.

3. The light fixture according to claim 2, wherein the sidewall extends in the direction away from the at least one light source or towards the at least one light source.

4. The light fixture according to claim 1, wherein a length of the membrane extends from the first end to the second end, and wherein the length varies with movement of the lens.

5. The light fixture according to claim 4, wherein the length varies up to 300 mm with the movement of the lens.

6. The light fixture according to claim 1, wherein the membrane at the first end comprises an edge portion extending toward the inner cavity and terminating in a free end, and wherein the lens is attached to the membrane along the edge portion.

7. The light fixture according to claim 6, wherein a plurality of apertures is formed in the edge portion for attachment of the lens.

8. The light fixture according to claim 1, wherein the membrane at the second end comprises an outwardly projecting wall portion forming a collar circumferentially around the membrane, the projecting wall portion extending outwardly from the tubular shape and terminating in a free edge outside the inner cavity.

9. The light fixture according to claim 8, wherein an end portion of the sidewall is arranged in the collar to attach the second end to the sidewall.

10. The light fixture according to claim 1, further comprising at least one motor configured to move the lens, the at least one motor being controlled by input from a computer.

11. The light fixture according to claim 10, wherein the computer controls movement of the lens in order to ventilate the light fixture when a predetermined temperature is exceeded.

12. The light fixture according to claim 1 further comprising a second compartment, wherein an opening is arranged in a joint between the first compartment and the second compartment to allow at least one of ventilation of or pressure equalization in at least one of the first compartment or the second compartment.

13. The light fixture according to claim 12, wherein the opening is arranged in a rotational joint between the first compartment and the second compartment, the rotational joint comprising cooperating first and second attachment structures.

14. The light fixture according to claim 1, wherein the membrane comprises a bellows.

15. The light fixture according to claim 1, wherein a diameter of the membrane is between 100 mm and 500 mm.

16. The light fixture according to claim 1, wherein a material thickness of the membrane is between 0.5 and 3.0 mm.

17. The light fixture according to claim 1, wherein the membrane is made from a material selected from a group consisting of rubber, ethylene propylene diene monomer (EPDM), an elastomer, silicone, polytetrafluoroethylene (PTFE), polyoxymethylene (POM), and aluminum.

18. The light fixture according to claim 1, wherein secondary light sources are attached to the lens.

* * * * *